(12) United States Patent
Border et al.

(10) Patent No.: US 8,134,589 B2
(45) Date of Patent: Mar. 13, 2012

(54) ZOOM BY MULTIPLE IMAGE CAPTURE

(75) Inventors: John N. Border, Walworth, NY (US); Joseph R. Bietry, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 884 days.

(21) Appl. No.: 12/175,142

(22) Filed: Jul. 17, 2008

(65) Prior Publication Data
US 2010/0013906 A1    Jan. 21, 2010

(51) Int. Cl.
*H04N 7/00* (2006.01)
*G03B 13/10* (2006.01)
*G02B 15/14* (2006.01)

(52) U.S. Cl. .......... 348/36; 348/211.9; 348/240.99; 396/379; 359/354; 359/676

(58) Field of Classification Search .......... 348/36, 348/211.9, 240.2, 240.3, 240.99; 359/354, 359/676; 396/379
See application file for complete search history.

(56) References Cited

U.S. PATENT DOCUMENTS

| | | | |
|---|---|---|---|
| 5,164,831 A | 11/1992 | Kuchta et al. | |
| 5,200,860 A * | 4/1993 | Hirasawa et al. | 359/696 |
| 5,270,780 A * | 12/1993 | Moran et al. | 356/5.04 |
| 5,657,402 A | 8/1997 | Bender et al. | |
| 5,717,512 A | 2/1998 | Chmielewski, Jr. et al. | |
| 5,973,726 A * | 10/1999 | Iijima et al. | 348/38 |
| 6,034,716 A * | 3/2000 | Whiting et al. | 348/36 |
| 6,235,141 B1 | 5/2001 | Feldman et al. | |
| 6,304,284 B1 * | 10/2001 | Dunton et al. | 348/36 |
| 6,610,166 B1 * | 8/2003 | Harden et al. | 156/242 |
| 6,639,625 B1 * | 10/2003 | Ishida et al. | 348/218.1 |
| 7,064,783 B2 | 6/2006 | Colavin et al. | |
| 7,245,443 B2 * | 7/2007 | Togino | 359/725 |
| 7,277,118 B2 * | 10/2007 | Foote | 348/36 |
| 7,317,473 B2 | 1/2008 | Chen et al. | |
| 7,382,399 B1 * | 6/2008 | McCall et al. | 348/207.99 |
| 7,474,731 B2 * | 1/2009 | Spahn | 378/62 |
| 7,495,694 B2 * | 2/2009 | Cutler | 348/218.1 |
| 7,609,289 B2 * | 10/2009 | Rastegar et al. | 348/36 |
| 7,623,781 B1 * | 11/2009 | Sassa | 396/322 |
| 7,848,628 B2 * | 12/2010 | Ujisato et al. | 396/72 |
| 2002/0075258 A1 | 6/2002 | Park et al. | |
| 2003/0001099 A1 * | 1/2003 | Coles et al. | 250/369 |
| 2003/0004584 A1 * | 1/2003 | Hallett | 700/17 |
| 2003/0160789 A1 * | 8/2003 | Tang et al. | 345/440 |
| 2006/0011724 A1 * | 1/2006 | Joseph et al. | 235/454 |
| 2006/0119732 A1 * | 6/2006 | Ohta | 348/347 |
| 2006/0125937 A1 * | 6/2006 | LeGall et al. | 348/240.99 |
| 2007/0081081 A1 | 4/2007 | Cheng | |

(Continued)

FOREIGN PATENT DOCUMENTS

WO    WO 2004/084542 A1    9/2004

*Primary Examiner* — Alina N. Boutah
(74) *Attorney, Agent, or Firm* — Peyton C. Watkins

(57) ABSTRACT

An image sensor assembly includes a fixed focal length optical lens; a mirror that reflects light from the scene to an optical lens and moves into a plurality of positions; and an image sensor that receives the light after it passes through the optical lens and captures a plurality of images that represents each image captured from each position of the mirror; wherein at least portions of the plurality of images are stitched together to form a composite image with a desired zoom factor.

17 Claims, 5 Drawing Sheets

U.S. PATENT DOCUMENTS

| | | | |
|---|---|---|---|
| 2007/0102520 A1* | 5/2007 | Carlson et al. | 235/454 |
| 2007/0263113 A1 | 11/2007 | Baek et al. | |
| 2008/0068451 A1* | 3/2008 | Hyatt | 348/36 |
| 2008/0111881 A1* | 5/2008 | Gibbs et al. | 348/36 |
| 2008/0247745 A1 | 10/2008 | Nilsson | |
| 2009/0073254 A1* | 3/2009 | Li et al. | 348/36 |
| 2010/0002071 A1* | 1/2010 | Ahiska | 348/36 |
| 2010/0328505 A1* | 12/2010 | Imamura | 348/273 |

* cited by examiner

ZOOM BY MULTIPLE IMAGE CAPTURE

FIELD OF THE INVENTION

The present invention generally relates to a compact zoom system for digital cameras. More particularly, the invention pertains to an apparatus and method for a zoom system wherein a plurality of images with different fields of view are used to create different images within the zoom range.

BACKGROUND OF THE INVENTION

Currently, most digital cameras use a zoom lens and a single color image sensor to capture still and video images. The captured images are then digitally processed to produce digital image files, which are stored in a digital memory in the camera. The digital image files can then be transferred to a computer, displayed, and shared via the Internet. The digital camera can also be included as part of a mobile telephone, to form a so-called "camera phone." The camera phone can transmit the digital image files to another camera phone, or to service providers, via a mobile telephone network.

Small camera size and a large zoom range are two very important features of digital cameras. Users prefer to have a zoom function to provide a more flexible photographic capability. The zoom range is typically composed of both optical zoom which is provided by variable focal length lenses and digital zoom which is provided by a magnification of the digital image after capture. Variable focal length lenses for large zoom range are expensive and generally increase the overall size of the digital camera. Thus, there are trade-offs between small camera size, large zoom range, and low camera cost which must be made when designing a digital camera. With higher cost cameras, such as single lens reflex cameras, these problems are sometimes addressed by using multiple interchangeable zoom lenses, such as two 3:1 zoom lenses, e.g., a 28-70 mm zoom and a 70-210 zoom. This arrangement has user inconvenience shortcomings and higher cost, as well as design complexity issues that make it unsuitable for low cost digital cameras.

Digital zoom based on increased magnification of the image with a corresponding decrease in resolution is well known in the art. Although digital zoom is very fast and simple, the decrease in resolution can produce a perceived decrease in image quality.

In U.S. Pat. No. 5,657,402, a method is described in which a plurality of digital images is combined to form an image. U.S. Pat. No. 5,657,402 addresses the use of multiple images captured at different focal lengths or different times wherein "the plurality of images of various focal lengths, such as a zoom video sequence" (col. 1 lines 21-22) are captured from the same lens. However, U.S. Pat. No. 5,657,402 does not include methods for enabling different fields of view to be captured. In addition, the images captured in U.S. Pat. No. 5,657,402 all include the same number of pixels so that the total exposure time, as well as the storage and readout time, are increased with multiple images.

In U.S. Patent Application 2002/0075258, a panoramic camera system is described in which a moveable telephoto camera is additionally used to capture a high resolution portion of the scene which is then overlaid onto the panoramic image. U.S. Patent Application 2002/0075258 describes the use of a moveable telephoto camera to enable a higher resolution of a portion of the image, wherein the moveable telephoto camera can be moved to the region of the panoramic image where the higher resolution is desired. However, U.S. Patent Application 2002/0075258 uses images of different focal lengths and the image produced has areas of different resolution.

In U.S. Pat. No. 5,717,512, a system for capturing images with different fields of view is described. The system is based on a rotatable and tiltable lens system driven by motors for capturing images of people at an Automatic Teller Machine. The system is large and complex as shown in FIG. 1, and as such is unsuited for use in a compact camera system. The system as described in U.S. Pat. No. 5,717,512 includes three mirrors, a pan and tilt mirror 34, and two folding mirrors 58 and 59 to redirect the light collected from the scene by the pan and tilt mirror to the camera 60. The system also includes three drive motors. The pan and tilt mirror is held in a frame 31 which can be rotated about the optical axis of the imaging lens 36 by pan drive motor 52. The pan drive motor 52 is mounted in pivot plate 53 which is rotatably attached to mounting plate 43. The pan and tilt mirror 34 can also be tilted by the tilt drive motor 44 which is attached to the pan and tilt mirror 34 by linkage 33. The tilt drive motor 44 is attached to pivot plate 53 so that it rotates with pan motions. Focusing of the image onto the camera is done by moving the imaging lens along the optical axis by focus motor 38 and along guide rods 39.

In U.S. Patent Application 2007/0081081, a camera system is mounted on a rotating pivot for capturing overlapping images for a panoramic image. A sensor is included which indicates when each of the multiple images should be captured for good overlap.

No prior art system provides a sufficiently compact, low cost, optical system with a large zoom range for a small, lightweight and relatively inexpensive consumer digital camera. It is additionally desirable to retain good image quality while avoiding substantial increases in the file size associated with a multiple image capture based process while still enabling a large zoom range.

SUMMARY OF THE INVENTION

It is an object of the present invention to provide a simple, compact zoom system by utilizing a fixed focal length lens with no moving parts. The invention uses a moveable mirror to redirect the field of view for sequential image captures so that a wide angle image is constructed from sequential images which each have partially overlapping fields of view. In addition, the images are progressively binned as the number of images captured increases to keep the number of pixels and the readout time relatively constant throughout the zoom range. Further, the exposure time for each image is reduced as the images are progressively binned to keep the total exposure time relatively constant throughout the zoom range.

These and other aspects, objects, features and advantages of the present invention will be more clearly understood and appreciated from a review of the following detailed description of the preferred embodiments and appended claims, and by reference to the accompanying drawings.

Advantageous Effect of the Invention

The present invention has the advantage of providing a zoom module with a fixed focal length lens to reduce the cost of the lens while being compact in overall size. Another advantage provided by the invention is that a zoom module is provided that is compatible with a lens and sensor assembly that has been produced by wafer level manufacturing. A further advantage provided by the invention is that a flexible zoom system is provided from multiple image captures in such a way that the number of pixels in the formed composite image, the total readout and storage time, and the total exposure time are all kept relatively constant through the zoom range in spite of the multiple images that are captured.

DETAILED DESCRIPTION OF THE INVENTION

With the advent of panoramic imaging, stitching algorithms have become available to enable efficient use of a plurality of images to produce a single image from a plurality of images as described in U.S. Pat. Nos. 7,317,473 and 7,064,783. In addition, as the overall size of digital cameras becomes smaller, the size of the lenses becomes smaller as well. The combination of these two changes in digital camera technology drives the present invention in which a compact moveable mirror is used to redirect the field of view of an imaging lens during capture to enable a plurality of images to be captured with partially overlapping fields of view in such a way that the plurality of images can be electronically stitched together to produce a composite image with a wider field of view. By using a substantially telephoto fixed focal length lens and capturing progressively more images as the zoom factor is reduced, different composite images can be produced that match the desired zoom factor.

Figure 1:
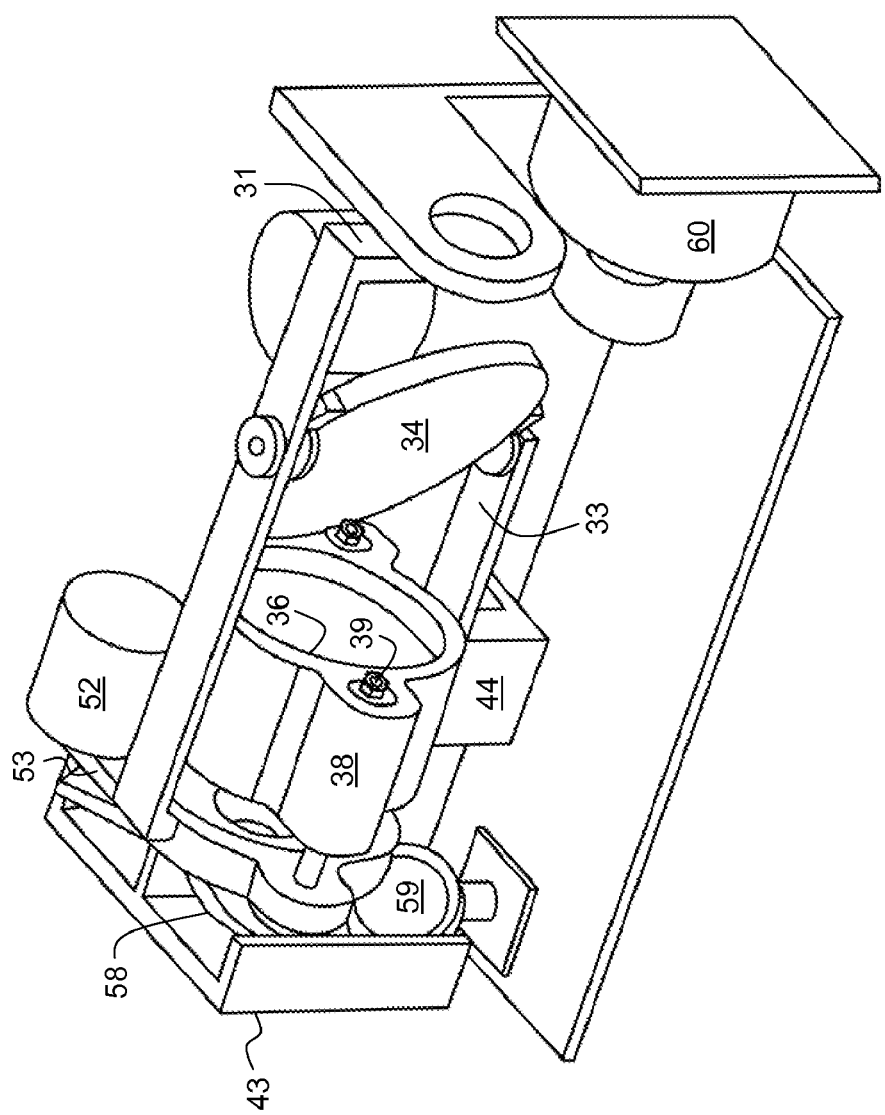
FIG. 1 is perspective view of a prior art camera system with a motor driven pan and tilt action.
Figure 2:
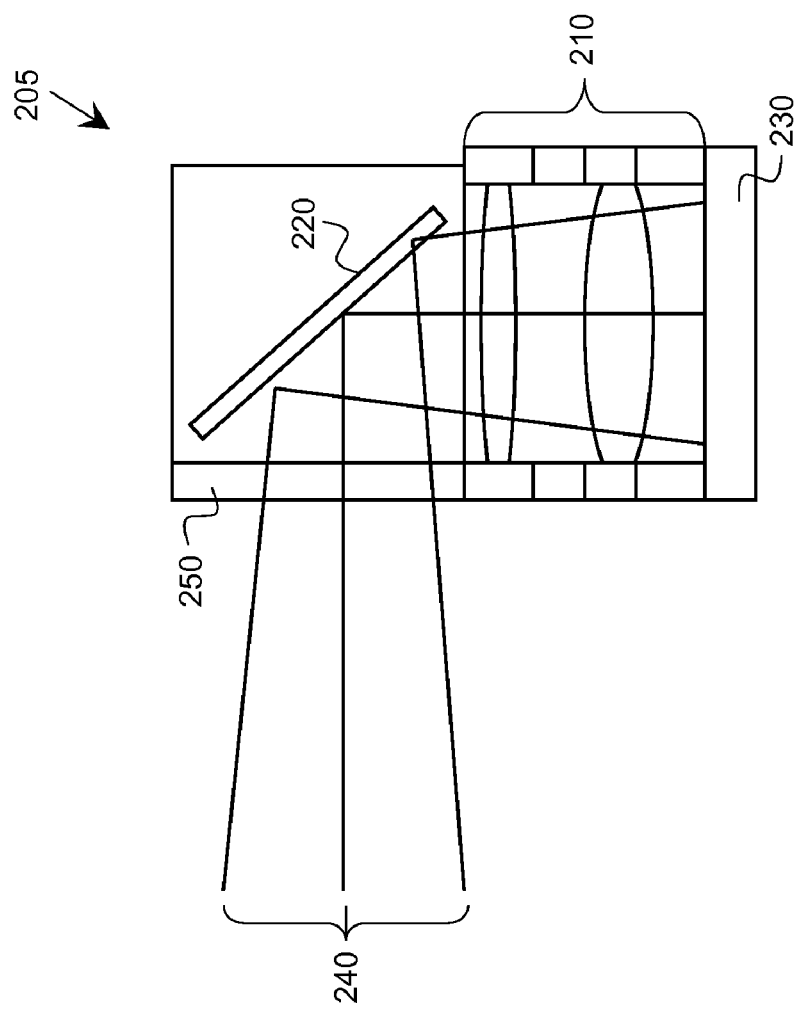
FIG. 2 is a side view of a cross section of the fixed focus lens and the moveable mirror as described in the present invention.

FIG. 2 shows an embodiment of the present invention showing a zoom module 205 which is capable of capturing sequential images with different fields of view. As shown in the embodiment of FIG. 2, a fixed focal length lens 210 is combined with a moveable mirror 220. The moveable mirror 220 is positioned at substantially 45 degrees to the optical axis of the fixed focal length lens 210 so that the zoom module is relatively thin. Light rays 240, from the scene being imaged, pass through a protective cover glass 250, are reflected by the moveable mirror 220, pass through the fixed focal length lens 210, and are focused onto an image sensor array 230 where an electronic image is formed. The image is recorded by the pixels that make up the image sensor array 230. An advantage of using a fixed focal length lens 210 in the zoom module 205 is that fixed focal length lenses can be obtained that are very compact and at low cost, this is particularly true for lens assemblies made by wafer level manufacturing. In wafer level manufacturing, the lens elements are made many at a time in arrays that are bonded together and then diced to form individual lens assemblies as described in U.S. Pat. Nos. 6,235,141 and 6,610,166. Lens elements that are made in arrays for wafer level manufacturing are typically very simple in form and very small in size. Zoom lenses are not presently made by wafer level manufacturing.

Figure 3:
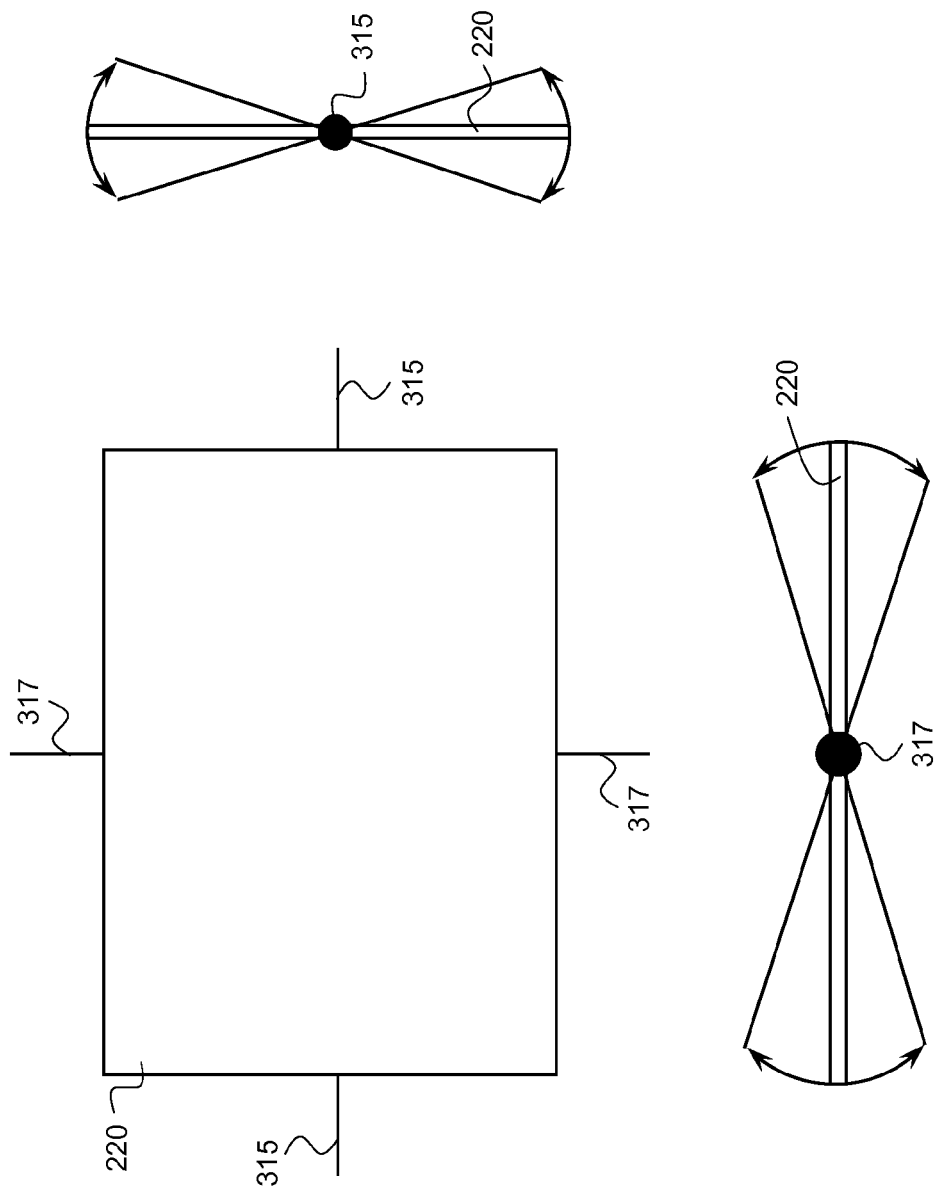
FIG. 3 is a diagram of the moveable mirror of the present invention.

FIG. 3 shows more detailed information about the moveable mirror. The reflective portion of the mirror 220 can rotate independently about two perpendicular axes 315 and 317 so that a number of positions are possible. The two sideviews of the mirror shown in FIG. 3 show the angular rotation of the mirror 220 rotating about the axes 315 and 317. The mirror 220 is capable of positions within a rotation range of +/−3 degrees to +/−12 degrees or more about the axes 315 and 317. As is well known by those in the art, a rotation of a mirror about an axis provides a 2× deflection of the angle of the light that is reflected by the mirror, as a result, the field of view changes by +/−6 degrees to +/−24 degrees as described.

In one embodiment of the invention, multiple images are captured and stitched together to form a composite image with a wider angle perspective than would otherwise be possible with the fixed focal length lens alone. The moveable mirror is used to change the field of view between image captures. To achieve a wider angle composite image, the number of images captured is increased. To produce a composite image with good image quality and no gaps or perceived discontinuities between images, the fields of view of the multiple images must be at least partially overlapped to enable the images to be stitched together using stitching algorithms.

Figure 4:
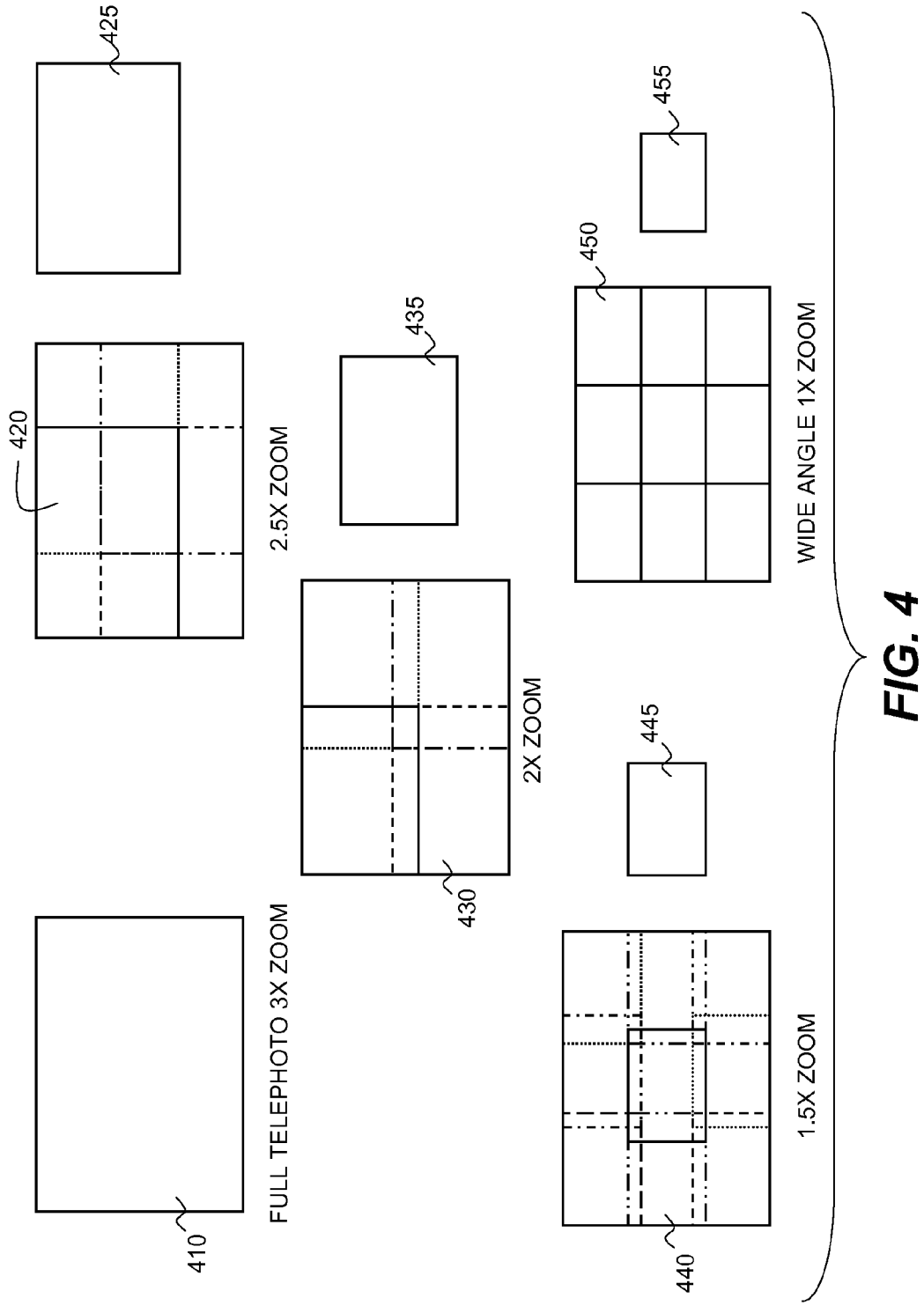
FIG. 4 is a diagram of the layout and overlap of the multiple images as used throughout the zoom range for a 3× zoom of the present invention.

FIG. 4 shows some of the layouts of the multiple images that are possible for different zoom settings from 1× to 3×. For the highest zoom setting, which in this example is 3×, a single image 410 is captured with the moveable mirror set in the middle of its rotation range for both axes. For a 2.5× zoom setting, four images of relative size 425 are captured and merged into a single 2.5× image layout 420. It is noted that image layout 420 contains four images 425 which are illustrated with different types of lines some of which overlap. It is further noted that image layouts 430, 440 and 450 also contain multiple images illustrated with different types of lines, some of which overlap.

The four images are captured sequentially with four different fields of view as provided by the moveable mirror moving sequentially between image captures. As shown in the 2.5× image layout 420, the image information from the respective fields of view partially overlap each other so that the portions of the four images that makeup the center of the 2.5× image layout 420 are the same for all four images. In contrast, the image information contained in the corners of the 2.5× image layout is made up from only one of the four images for each corner. Likewise, the 2× zoom layout 430 comes from four images captured that are of a relative size 435 as shown and the amount of overlap between the four images can be less than for the 2.5× zoom layout 420. The technique for merging the four images together can be a combination of alignment of the images to one another, summing and averaging the pixel values in overlapping areas and electronically stitching.

It should be noted that the present invention includes other methods for image layout such as the case wherein the amount of overlap between the multiple images is constant and the composite image is cropped to varying degrees for different zoom settings or zoom factors.

For the case of a 1.5× zoom layout 440, more images are required, nine images are shown for this case in FIG. 4. The nine images of relative size 445 are captured and merged into a single 1.5× image layout 440. As the zoom setting decreases, the number of images required to be captured increases and the relative size of the individual images captured as compared to the size of the composite image decreases. In other words, the plurality of images captured is inversely proportional to the zoom factor. As shown, the relative size of the individual image captured for the 1.5× zoom setting based on scene content is approximately $\frac{1}{9}^{th}$ the size of the composite image formed when the individual images are merged.

For the final case shown in the example of FIG. 4, the zoom setting is 1× and nine individual images of relative size 455 are captured and merged in a 1× zoom layout 450. In this case, the overlap between the individual images and their respective fields of view is only a small amount so that the individual images can be stitched together to form a wider angle image without any gaps in the composite image.

It is further noted that digital zoom can be used for augmenting portions of the zoom range to provide a smoother transition between the number of captures. In addition, to make stitching easier, distortion within the individual images from the lens (such as barrel or pincushion distortion) or from off axis capture from the tilted mirror may be corrected prior to stitching. In addition for low resolution preview images, such as those that are continuously displayed on the camera display for selecting the image composition, the multiple images may be cropped and stitched together to form a low resolution composite image based on the mirror locations without having to use complex stitching algorithms.

While the example layouts shown in FIG. 4 are for a zoom range from 1× to 3×, the invention can be used for a wider zoom range as well by increasing the number of individual images captured and used to form a composite image with a wider field of view perspective such as 16 images in a 4×4 image layout for a 1× to 4× zoom range. It is important to note that the zoom range can be changed in the zoom system described by the present invention without having to change the fixed focal length lens since the multiple image approach provides a method for making images that are of a wider angle perspective limited only by the available movement of the moveable mirror.

Alternately, the fixed focal length lens can be changed to change the effective focal length range that is associated with the zoom range to make the images substantially more telephoto or more wide angle. For example, if the fixed focal length lens has a focal length of 15 mm, the multiple image approach of the present invention can be used to produce images that appear to have been captured by a zoom lens with a focal length range of 5-15 mm (substantially wide angle) by laying out the images as shown in FIG. 4 for a 1× to 3× zoom range. However, if the fixed focal length lens has a focal length of 45 mm, the multiple image approach of the present invention can be used to produce images that appear to have been captured by a zoom lens with a focal length range of 15-45 mm (substantially telephoto) by laying out the images as shown in FIG. 4 for a different 1× to 3× zoom range. The mirror positions associated with the different focal length ranges would have to be adjusted to provide the desired degree of overlap between the multiple images.

The present invention describes a method of merging multiple images with partially overlapping fields of view as provided by a moveable mirror to form a composite image with a wider angle perspective. The example layouts of the multiple images as shown in FIG. 4 are all of the same aspect ratio; however, different aspect ratio composite images can be created by changing the layout of the multiple images (such as to a 3×4 image layout) in the composite image to produce whatever aspect ratio or image shape is desired.

In another embodiment of the present invention, in one or more of the captured images, the image sensor pixels are binned in reverse correspondence to the zoom factor so that the total number of pixels in the composite image is kept relatively constant through the zoom range. It is noted that each individual image is captured with a different mirror position, and the binning factor is proportional to the number of mirror positions. Binning involves the electrical connection of neighboring pixels to share the electrical charge that is produced by the light on the pixels so that the binned pixel is effectively larger in area (and as such more sensitive to light) and the number of pixels in the individual image is reduced. As an example, for the case of the 2× zoom setting where four individual images are captured, the pixels would be binned by 4× during the image capture thereby reducing the number of pixels in each individual image to $\frac{1}{4}^{th}$ so that the total number of pixels contained in the four individual images is the same as the one image captured for the case of the 3× zoom setting. The advantage of binning the sensor during the capture of the individual images is that the readout time of the image from the sensor is reduced. By keeping the total number of pixels from the multiple image capture set relatively constant, the time to readout the multiple individual images is kept relatively constant in spite of the multiple images being captured.

In a further embodiment of the present invention, only non-overlapping portions of the individual images are readout to further reduce the readout time. In this case, the large areas of overlap between the individual images (such as shown for the 2.5× zoom layout in FIG. 4) are selected so that the image information for each portion of the composite image is only readout from one individual image. Of course, those skilled in the art will recognize that some small amount of overlap between images must be maintained to insure good stitching between the individual images during the merging process to form the composite image.

In yet a further embodiment of the invention, the exposure time for each individual image is reduced to match the degree of binning for the image capture. Since binning effectively increases the area of each pixel, the light gathering capability or sensitivity of the pixel is increased proportionally. Consequently, reducing the exposure time to match the degree of binning results in the signal level and the relative noise level recorded by the pixel remaining constant for a given light level. Since the exposure time is reduced at the same rate as the pixels are binned and the binning matches the number of individual images captures in the multiple image capture set, the total exposure time for the multiple images remains relatively constant through the zoom range. As an example, for the case of the 2× zoom setting where four individual images are captured, the exposure time for each individual image would be reduced to $\frac{1}{4}^{th}$ so that the total exposure time for the four individual images is the same as the exposure time for the one individual image that is captured for the case of the 3× zoom setting.

Example 1

A moveable MEMs mirror from Mirrorcle (model SO258DB with a 3.2 mm mirror, +/−6.6 degree movement and 5 millisecond movement time with no overshoot) is used with a telephoto lens that has a 12 degree field of view and an image sensor that has 5 megapixels. For an image with a 3× zoom setting, a single image is captured at the full resolution of the image sensor, 100 millisecond exposure time and the mirror is kept in the center position. For a 2× zoom image, four images are captured with four pixels binned together and an exposure time of 25 millisecond each. The mirror is moved (in degrees) in the following pan/tilt order during the capture of the multiple images: +3/+2; +3/−2; −3/−2; −3/+2. The total exposure time is 4×25+4×5=120 millisecond. The total resolution (in megapixels) of the composite image produced from the four individual images captured is 4×5/4=5 megapixels. In comparison, if four full resolution images had been captured and stitched together, the total exposure time would be 4×100=400 millisecond and the total resolution of the stitched image would be 4×5=20 megapixels. For a 1× zoom image, nine images are captured with nine pixels binned together and an exposure time of 11 millisecond each. The mirror is moved (in degrees) in the following pan/tilt order during the capture of the multiple images: +6/+4; +6/0; +6/−4; 0/−4; 0/0; 0/+4; −6/+4; −6/0; −6/−4. The total exposure time is 9×11+9×5=144 millisecond. The total resolution (in megapixels) of the composite image produced from the nine individual images captured is 9×5/9=5 megapixels. In comparison, if nine full resolution images had been captured and stitched together, the total exposure time would be 9×100=900 millisecond and the total resolution of the stitched image would be 9×5=45 megapixels.

Figure 5:
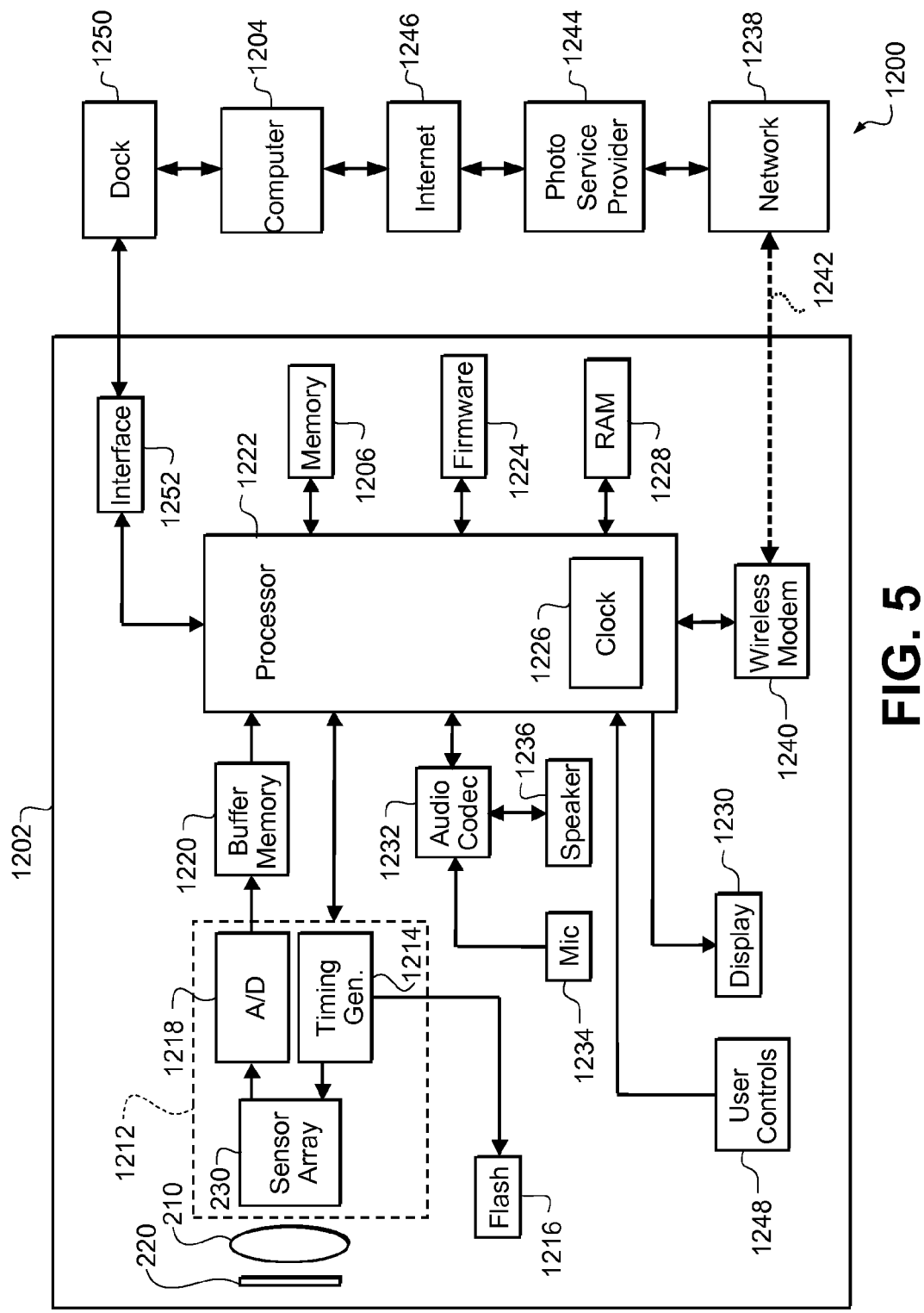
FIG. 5 is block diagram of an imaging system of the present invention using the imaging assembly of FIG. 2.

FIG. 5 is a block diagram of an imaging system that can be used with the image sensor assembly of present the invention. Imaging system 1200 includes digital camera phone 1202 and computing device 1204. Digital camera phone 1202 is an example of an image capture device that can use an image sensor incorporating the present invention. Other types of image capture devices can also be used with the present invention, such as, for example, digital still cameras and digital video camcorders.

Digital camera phone 1202 is a portable, handheld, battery-operated device in an embodiment in accordance with the invention. Digital camera phone 1202 produces digital images that are stored in memory 1206, which can be, for example, an internal Flash EPROM memory or a removable memory card. Other types of digital image storage media, such as magnetic hard drives, magnetic tape, or optical disks, can alternatively be used to implement memory 1206.

Digital camera phone 1202 uses mirror 220 and lens 210 to focus light from a scene (not shown) onto image sensor array 230 of sensor 1212. Wherein mirror 220, lens 210 and image sensor 230 are arranged as previously shown in FIG. 2. Image sensor array 230 provides color image information using the Bayer color filter pattern in an embodiment in accordance with the invention. Image sensor array 230 is controlled by timing generator 1214, which also controls flash 1216 in order to illuminate the scene when the ambient illumination is low.

The analog output signals output from the image sensor array 230 are amplified and converted to digital data by analog-to-digital (A/D) converter circuit 1218. The digital data are stored in buffer memory 1220 and subsequently processed by digital processor 1222. Digital processor 1222 is controlled by the firmware stored in firmware memory 1224, which can be flash EPROM memory. Digital processor 1222 includes real-time clock 1226, which keeps the date and time even when digital camera phone 1202 and digital processor 1222 are in a low power state. The processed digital image files are stored in memory 1206. Memory 1206 can also store other types of data, such as, for example, music files (e.g. MP3 files), ring tones, phone numbers, calendars, and to-do lists.

In one embodiment in accordance with the invention, digital camera phone 1202 captures still images. Digital processor 1222 performs distortion correction, color interpolation followed by color and tone correction, in order to produce rendered sRGB image data. The rendered sRGB image data are then compressed and stored as an image file in memory 1206. By way of example only, the image data can be compressed pursuant to the JPEG format, which uses the known "Exif" image format. This format includes an Exif application segment that stores particular image metadata using various TIFF tags. Separate TIFF tags can be used, for example, to store the date and time the picture was captured, the lens f/number and other camera settings, and to store image captions.

Digital processor 1222 produces different image sizes that are selected by the user in an embodiment in accordance with the invention. One such size is the low-resolution "thumbnail" size image. Generating thumbnail-size images is described in commonly assigned U.S. Pat. No. 5,164,831, entitled "Electronic Still Camera Providing Multi-Format Storage of Full and Reduced Resolution Images" to Kuchta, et al. The thumbnail image is stored in RAM memory 1228 and supplied to color display 1230, which can be, for example, an active matrix LCD or organic light emitting diode (OLED). Generating thumbnail size images allows the captured images to be reviewed quickly on color display 1230.

In another embodiment in accordance with the invention, digital camera phone 1202 also produces and stores video clips. A video clip is produced by summing multiple pixels of image sensor array 1210 together (e.g. summing pixels of the same color within each 4 column×4 row area of the image sensor array 1210) to create a lower resolution video image frame. The video image frames are read from image sensor array 1210 at regular intervals, for example, using a 15 frame per second readout rate.

Audio codec 1232 is connected to digital processor 1222 and receives an audio signal from microphone (Mic) 1234. Audio codec 1232 also provides an audio signal to speaker 1236. These components are used both for telephone conversations and to record and playback an audio track, along with a video sequence or still image.

Speaker 1236 is also used to inform the user of an incoming phone call in an embodiment in accordance with the invention. This can be done using a standard ring tone stored in firmware memory 1224, or by using a custom ring-tone downloaded from mobile phone network 1238 and stored in memory 1206. In addition, a vibration device (not shown) can be used to provide a silent (e.g., non-audible) notification of an incoming phone call.

Digital processor 1222 is connected to wireless modem 1240, which enables digital camera phone 1202 to transmit and receive information via radio frequency (RF) channel 1242. Wireless modem 1240 communicates with mobile phone network 1238 using another RF link (not shown), such as a 3GSM network. Mobile phone network 1238 communicates with photo service provider 1244, which stores digital images uploaded from digital camera phone 1202. Other devices, including computing device 1204, access these images via the Internet 1246. Mobile phone network 1238 also connects to a standard telephone network (not shown) in order to provide normal telephone service in an embodiment in accordance with the invention.

A graphical user interface (not shown) is displayed on color display 1230 and controlled by user controls 1248. User controls 1248 include dedicated push buttons (e.g., a telephone keypad) to dial a phone number, a control to set the mode (e.g., "phone" mode, "calendar" mode" "camera" mode), a joystick controller that includes 4-way control (up, down, left, right), and a push-button center "OK" or "select" switch, in embodiments in accordance with the invention.

Dock 1250 recharges the batteries (not shown) in digital camera phone 1202. Dock 1250 connects digital camera phone 1202 to computing device 1204 via dock interface 1252. Dock interface 1252 is implemented as wired interface, such as a USB interface, in an embodiment in accordance with the invention. Alternatively, in other embodiments in accordance with the invention, dock interface 1252 is implemented as a wireless interface, such as a Bluetooth or an IEEE 802.11b wireless interface. Dock interface 1252 is used to download images from memory 1206 to computing device 1204. Dock interface 1252 is also used to transfer calendar information from computing device 1204 to memory 1206 in digital camera phone 1202.

Within the scope of the invention, the stitching of the multiple images to form the composite image can be done within the digital camera phone 1202 by the processor 1222 or done remotely by the computer 1204 or by another processing device that the multiple images can be sent to through the wireless modem 1240 or interface 1252.

The present invention has been described in detail with particular reference to certain preferred embodiments thereof, but it will be understood that variations and modifications can be effected within the spirit and scope of the invention.

PARTS LIST 31 frame
33 linkage
34 pan and tilt mirror
36 imaging lens
38 focus motor
39 guide rods
43 mounting plate
44 tilt drive motor
52 pan drive motor
53 pivot plate
58 folding mirror
59 folding mirror
60 camera
205 zoom module
210 fixed focal length lens assembly
220 moveable mirror
230 image sensor array
240 light rays from the scene
250 cover glass
315 mirror axis of rotation
317 mirror axis of rotation
410 3× zoom layout
420 2.5× zoom layout
425 relative size of individual image for 2.5× zoom
430 2× zoom layout
435 relative size of individual image for 2× zoom
440 1.5× zoom layout
445 relative size of individual image for 1.5× zoom
450 1× zoom layout
455 relative size of individual image for 1× zoom
1200 imaging system
1202 digital camera phone
1204 computing device
1206 memory
1212 pixel sensor
1214 timing generator
1216 flash
1218 A/D converter circuit
1220 buffer memory
1222 digital processor
1224 firmware memory
1226 clock
1228 RAM memory
1230 color display
1232 audio codec
1234 microphone
1236 speaker
1238 mobile phone network
1240 wireless modem
1242 radio frequency (RF) channel
1244 photo service provider
1246 Internet
1248 user controls
1250 dock
1252 dock interface

The invention claimed is:

1. An image sensor assembly comprising:
   (a) a fixed focal length optical lens;
   (b) a mirror that reflects light from a scene to an optical lens and moves into a plurality of positions; and
   (c) an image sensor that receives the light after it passes through the optical lens and captures a plurality of images that represents each image captured from each position of the mirror; wherein at least portions of the plurality of images are stitched together to form a composite image with a desired zoom factor; wherein the image sensor pixels are binned in reverse correspondence to the zoom factor for one or more of the captured images; a binning factor of the binned images is proportional to the number of mirror positions which forms a degree of binning, and exposure time for each individual image is reduced to match the degree of binning for the image.

2. The image sensor assembly as in claim 1, wherein the plurality of images captured is inversely proportional to the zoom factor.

3. The image sensor assembly as in claim 1, wherein only the portions of the captured images to be used in the composite image are readout.

4. The image sensor assembly as in claim 1, wherein the mirror rotates about two axes.

5. The image sensor assembly as in claim 1, wherein the lens is telephoto.

6. The image sensor assembly as in claim 1, wherein the mirror includes at least a position having forty five degrees or greater to an optical axis of the lens.

7. The image sensor assembly as in claim 1, wherein the lens is manufactured by wafer level manufacturing.

8. The image sensor assembly as in claim 1, further comprising digital zoom which is used for augmenting portions of a zoom range.

9. An image capture device comprising:
   an image sensor assembly comprising:
   (a) a fixed focal length optical lens;
   (b) a mirror that reflects light from a scene to an optical lens and moves into a plurality of positions; and
   (c) an image sensor that receives the light after it passes through the optical lens and captures a plurality of images that represents each image captured from each position of the mirror; wherein at least portions of the plurality of images are stitched together to form a composite image with a desired zoom factor; wherein the image sensor pixels are binned in reverse correspondence to the zoom factor for one or more of the captured images; a binning factor of the binned images is proportional to the number of mirror positions which forms a degree of binning, and exposure time for each individual image is reduced to match the degree of binning for the image.

10. The image sensor assembly as in claim 1, wherein during image capture, readout of non-overlapping portions of individual images are readout.

11. The image capture device as in claim 9, wherein the plurality of images captured is inversely proportional to the zoom factor.

12. The image capture device as in claim 9, wherein only the portions of the captured images to be used in the composite image are readout.

13. The image capture device as in claim 9, wherein the mirror rotates about two axes.

14. The image capture device as in claim 9, wherein the lens is telephoto.

15. The image capture device as in claim 9, wherein the mirror includes at least a position having forty five degrees or greater to an optical axis of the lens.

16. The image capture device as in claim 9, wherein the lens is manufactured by wafer level manufacturing.

17. The image capture device as in claim 9, further comprising digital zoom which is used for augmenting portions of a zoom range.

* * * * *